July 3, 1923.

M. DE CONINCK 1,460,661

FLEXIBLE GEARING

Filed June 8, 1920

INVENTOR
Marcel de Coninck
BY
Townsend + Baker
ATTORNEYS

Patented July 3, 1923.

1,460,661

UNITED STATES PATENT OFFICE.

MARCEL DE CONINCK, OF LE HAVRE, FRANCE.

FLEXIBLE GEARING.

Application filed June 8, 1920. Serial No. 387,384.

*To all whom it may concern:*

Be it known that I, MARCEL DE CONINCK, of 46 Rue Félix-Faure, Le Havre, Seine-Inférieure, France, have invented new and useful Improvements in Flexible Gearing, which improvements are fully set forth in the following specification.

This invention relates to flexible gearing and according to this invention a toothed wheel is so constructed that one tooth is capable of peripheral movement with respect to its neighbouring teeth, and the teeth are capable of peripheral movement relatively to the hub; the relative value of such movement is determined by the conditions of power to be transmitted, the ratios of speed to be obtained and the size of the wheel, etc.

Figure 1:
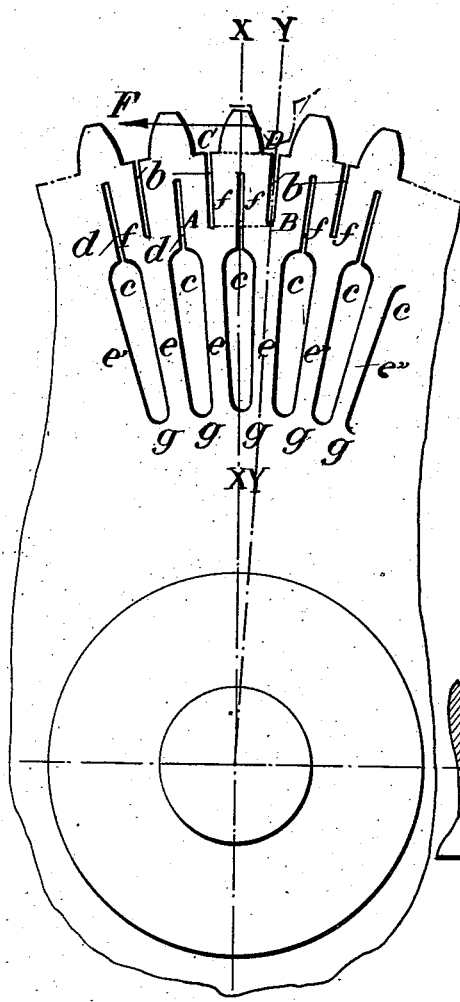
Figure 2:
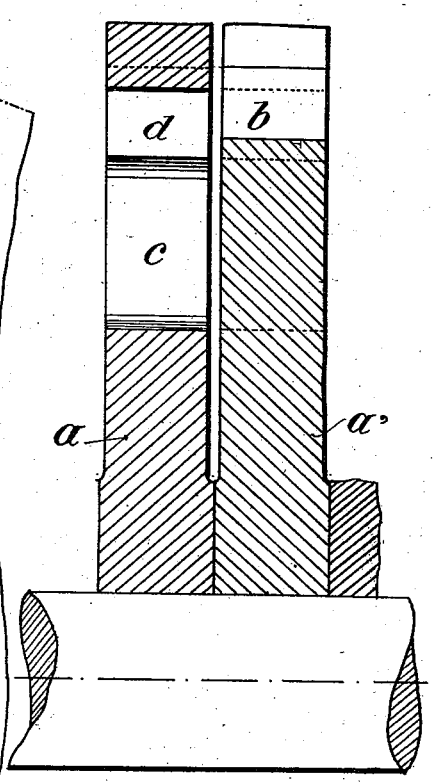

The invention is illustrated in the accompanying drawing in which Figure 1 is a front elevation of a flexible toothed wheel constructed in accordance with this invention and Figure 2 is a radial section through two contiguous wheel elements, the left hand portion being a section on the line X—X, Figure 1, and the right hand portion a section on the line Y—Y, Figure 1. The gear wheel is composed of one or more disks $a\ a'$ formed of a metal having a suitable elasticity.

To obtain flexibility of one tooth relatively to another tooth, radial teeth which extend a certain depth below the teeth are formed by the provision of slots $b$ while flexibility between the teeth and the hub is obtained by providing hollow portions $c$ terminating in slots $d$ which are interposed between the slots $b$.

If a tangential force F be applied to one of the teeth, such force will deflect the prism A B C D, anchored at A B, a flexibility of tooth to tooth being thereby obtained. The shearing stress F on the teeth tends to deflect the arm $e\ e$ and this stress is transmitted to the neighbouring arms $e'\ e'$, $e''\ e''$, and so on, because such arms are prolonged by portions $f\ f$ which together form an elastic connection. The root $g$ of the arm $e$ is subjected to a bending moment whose value decreases according to a geometric progression starting from the sections situated to the right of the teeth in mesh. According to the value of the relative flexibility of the portions $f\ f\ f$ and the arms $e\ e'\ e''$, the bending stress will be transmitted to a greater or less number of arms. Therefore, by selecting suitable dimensions for the parts $f\ f$ and the arms $e\ e$, the total section of the arms subjected to the bending stress may be proportioned to the amount of power to be transmitted.

The advantages of this system of gear are as follows:—

The teeth in mesh may be subjected without exceeding the limit of elasticity in the sections $g\ g$ to a substantial peripheral displacement (measured by the bending of the arms $e\ e$) while retaining a high value for the tangential force.

This property is very valuable in gearings for high power with a great reduction ratio as the pinion takes the form of a toothed shaft of great length and of small diameter. It is known that in this case the distribution of the tangential force along the pinion cannot be uniform by reason of the torsion and flexion of the pinion. The gear wheel may then be formed of several disks constructed in accordance with this invention, whose hubs are keyed to a shaft; the flexibility of the system may be such that a small difference in the tangential force on each disk suffices to displace a tooth peripherally to the same amount as the displacement due to the torsion of the pinion shaft. In this manner differences in the distribution of the force between the several disks may be limited to a certain fraction of the normal force.

Another advantage obtained by such gearing consists in that the flexibility of one tooth to another does not necessitate great exactness in the shape of the teeth and gives at the same time a certain latitude from the point of view of the distance of the centres and of the parallelism of the shafts, without injuring the distribution of the tangential force between the different teeth simultaneously in mesh. The elasticity of the rim reduces noise and shock to a minimum and allows the tangential force per unit of length of tooth to be increased.

Claims.

1. A gear wheel formed of a plurality of toothed disks keyed to the same shaft, the teeth of these disks being flexibly mounted with respect to the body of said disk and having also an elastic connection with neighboring teeth of the same disk so as to be capable of a peripheral displacement of the same order of magnitude as that due to the torsion or flexion of the wheel for small differences in the value of the tangential force on the different disks.

2. In flexible gearing, a gear wheel having radial slots formed between the teeth and extending radially inward toward the hub and radial hollow portions formed in the body of the wheel, said hollow portions terminating in radial slots which alternate with the first said slots.

3. In flexible gearing the combination of a plurality of toothed wheels coupled together each having radial slots formed between the teeth and radial hollow portions formed in the body of the wheel, said hollow portions terminating in radial slots which alternate with the first said slots.

4. A gear wheel, formed of a plurality of toothed disks, keyed on to the same shaft, the teeth of the disks being separated by radial slots cut in the body of the disks, below the foot of the teeth, hollow portions terminating in slots interposed between the first named slots being provided in the disks, radially between the rim and the hub thereof to ensure flexibility between the teeth and the hub substantially as described.

In testimony that I claim the foregoing as my invention I have signed my name this 11th day of May, 1920.

MARCEL DE CONINCK.